United States Patent
Doi

(10) Patent No.: US 7,502,431 B2
(45) Date of Patent: Mar. 10, 2009

(54) METHOD AND APPARATUS FOR ESTIMATING RESPONSE CHARACTERISTIC, AND RECEIVING METHOD AND RECEIVER UTILIZING THE SAME

(75) Inventor: Yoshiharu Doi, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 712 days.

(21) Appl. No.: 10/715,487

(22) Filed: Nov. 19, 2003

(65) Prior Publication Data

US 2004/0101073 A1    May 27, 2004

(30) Foreign Application Priority Data

Nov. 20, 2002    (JP)    ............................. 2002-337306

(51) Int. Cl.
*H04B 7/10*    (2006.01)
*H04L 1/02*    (2006.01)

(52) U.S. Cl. ....................... 375/347; 375/142; 375/150; 375/343; 375/371

(58) Field of Classification Search ......... 375/346–350, 375/371–376, 142, 150, 343
See application file for complete search history.

(56) References Cited

U.S. PATENT DOCUMENTS

| | | | |
|---|---|---|---|
| 4,599,732 A | | 7/1986 | Lefever |
| 5,502,749 A | * | 3/1996 | Ozaki ......................... 375/368 |
| 5,561,665 A | | 10/1996 | Matsuoka et al. |
| 5,588,027 A | * | 12/1996 | Lim ............................ 375/330 |
| 5,751,776 A | * | 5/1998 | Shiino et al. ................. 375/371 |
| 6,728,326 B1 | | 4/2004 | Fulghum |
| 6,738,375 B1 | | 5/2004 | Okanoue |
| 7,016,434 B1 | * | 3/2006 | Huttunen ..................... 375/341 |
| 2002/0181509 A1 | * | 12/2002 | Mody et al. .................. 370/480 |
| 2003/0043891 A1 | | 3/2003 | Takahashi |
| 2004/0008802 A1 | * | 1/2004 | Galperin et al. ............. 375/343 |
| 2004/0057532 A1 | | 3/2004 | Kim et al. |

(Continued)

FOREIGN PATENT DOCUMENTS

EP    0 430 481 A2    11/1990

(Continued)

OTHER PUBLICATIONS

Japanese Office Action issued in corresponding Japanese Patent Application No. JP 2002-337306, dated Aug. 22, 2006.

(Continued)

*Primary Examiner*—Curtis B Odom
(74) *Attorney, Agent, or Firm*—McDermott Will & Emery LLP

(57) ABSTRACT

Baseband input units input baseband received signals. Initial value computation units compute correlation values by performing correlation processings between the baseband received signals and a training signal in the interval of the training signal. A phase error estimating unit outputs a phase error signal based on the baseband received signals arid the training signal. Weight computation units generate initial weighting coefficients by compensating the correlation values with the phase error signal, when the interval of the training signal ends. In the interval of a data signal, the weighting coefficients are updated from the initial weighting coefficients. A synthesizing unit adds up the baseband signals after weighting the baseband received signals with the weighting coefficients.

15 Claims, 16 Drawing Sheets

U.S. PATENT DOCUMENTS

2004/0199554 A1    10/2004    Aslanis et al.

FOREIGN PATENT DOCUMENTS

| EP | 1 195 961 A2 | 4/2002 |
|---|---|---|
| JP | 11-308036 | 11/1999 |
| JP | 2000-032069 | 1/2000 |
| JP | 2001-285161 | 10/2001 |
| JP | 2001-285189 | 10/2001 |
| JP | P2002-26788 A | 1/2002 |

OTHER PUBLICATIONS

Second Office Action for Corresponding Application No. 200310118025.3. Issue Date: Jun. 23, 2006.

Office Action issued in related Chinese Application No. 20030118025.3, issued Jan. 6, 2006.

Communication pursuant to Article 94(3) EPC issued in European Patent Application No. 03 026 576.3, dated Jan. 22, 2008.

European Search Report, issued in corresponding European Patent Application No. 03026576.3-1237, dated on Jul. 4, 2007.

European Office Action, issued in European Patent Application No. EP 03 026 576.3-1237 dated on Nov. 20, 2008.

* cited by examiner

METHOD AND APPARATUS FOR ESTIMATING RESPONSE CHARACTERISTIC, AND RECEIVING METHOD AND RECEIVER UTILIZING THE SAME

BACKGROUND OF THE INVENTION

1. Field of the Invention

The present invention relates to a response characteristic estimation technology and a receiving technology utilizing the same. It particularly relates to a weighting coefficient estimation method and apparatus, and to receiving method and apparatus, where those methods and apparatuses are utilized for synthesizing radio signals received by a plurality of antennas.

2. Description of the Related Art

In wireless communication, it is in general desired to effectively use limited frequency resources. In order to use the frequency resources effectively, radio waves of same frequency are, for example, utilized as repeatedly as possible in short-range. In this case, however, communication quality degrades because of cochannel interference caused by a radio base station or mobile terminal closely located, which utilizes the same frequency. As one technology for preventing such communication quality degradation deriving from the cochannel interference, the adaptive array antenna technology can be named.

In the adaptive array antenna technology, signals received by a plurality of antennas are respectively weighted with different weighting coefficients and synthesized. The weighting coefficients are adaptively updated so that an error signal between a signal to be transmitted and the signal after the synthesis might be small. Here, the signal to be transmitted is determined based on the signal after synthesis. In order to update the weighting coefficients adaptively, the RLS (Recursive Least Squares) algorithm, the LMS (Least Mean Squares) algorithm or the like is utilized. The RLS algorithm generally converges at high speed. The RLS algorithm, however, requires a high speed or a huge arithmetic circuit since computation performed is very complicated. The LMS algorithm can be realized with a simpler arithmetic circuit than that of the RLS algorithm. However, the convergence speed thereof is low.

Related Art List

1. Japanese Patent Application Laid-Open No. 2002-26788

A technology of determining weighting coefficients by correlation processing between a known transmission signal and a received signal is one that can determine the weighting coefficients at high speed with a simple circuit. However, unlike the adaptive algorithm, the technology utilizing the correlation processing can not track an environmental change. For example, if there is frequency offset between the frequency oscillators of a transmitter and a receiver, the frequency offset is reflected to the weighting coefficients as an error. If the weighting coefficient including an error is utilized in the adaptive array antenna technology, receiving characteristic generally degrades.

SUMMARY OF THE INVENTION

The inventor of the present invention has made the present invention in view of the foregoing circumstances and an object thereof is to provide a response characteristic estimation apparatus which estimates response characteristic at high speed with a simple arithmetic circuit and to provide a receiver utilizing the same. It is also an object of the present invention to provide a response characteristic estimation apparatus of which degradation in the estimation accuracy of response characteristic is reduced, wherein the degradation is caused by the frequency offset of the frequency oscillators between a transmitter and a receiver, and to provide the receiver utilizing the same. It is also an object of the present invention to provide a response characteristic estimation apparatus which can improve estimation accuracy of the frequency offset of the frequency oscillators between the transmitter and receiver and to provide the receiver utilizing the same.

A preferred embodiment according to the present invention relates to a response characteristic estimation apparatus. This apparatus includes: an input unit which inputs a received signal; a correlation processor which performs a correlation processing between the received signal which has been inputted and a known transmission signal; a phase error estimator which estimates a phase error of the received signal, which has been inputted, to the known transmission signal based on the received signal which has been inputted and the known transmission signal; and a phase error compensator which estimates response characteristic of the received signal, which has been inputted, to the known transmission signal by compensating a result of the correlation processing based on the estimated phase error.

When the phase error estimator estimates the phase error of the received signal, which has been inputted, to the known transmission signal based on the received signal which has been inputted and the transmission signal, the phase error estimator may utilize the received signal which has been inputted and the known transmission signal directly or indirectly. Here, for example, if the periodicity of the known transmission signal is utilized in the estimation, it can be said that the known transmission signal is utilized indirectly.

The response characteristic may include one acquired by performing complex conjugate transform thereon or one acquired by performing linear transform thereon. That is, the response characteristic includes transformed response characteristic which is acquired by transforming the response characteristic with a prescribed rule.

The known transmission signal is included in a prescribed interval in the received signal in a sequential manner. The response characteristic estimation apparatus further includes a controller which detects an end of the sequential interval of the known transmission signal from the received signal which has been inputted. In this apparatus, the phase error compensator may compensate the result of the correlation processing based on the estimated phase error at the detected end. The "sequential manner" merely means that the known received signal is sequential. As long as the known received signal is sequential, the time length thereof does not necessarily need to be long but may be short. Moreover, the "sequential manner" here may include a case where the known transmission signal is included in the received signal in a discrete manner in accordance with a certain rule, if the apparatus recognizes the rule. That is, the "sequential manner" here includes every case where the apparatus can recognize the transmission signal as "sequential" one.

By implementing the above structure, the apparatus can estimate the response characteristic at high speed since the estimation of the phase error and the correlation processing are performed in parallel and there occurs no delay between those two processings. Moreover, the response characteristic can be estimated with high accuracy since the result of the correlation processing is compensated utilizing the estimated phase error.

Another preferred embodiment according to the present invention relates to a response characteristic estimation method. This method includes: inputting a received signal; performing a correlation processing between the received signal which has been inputted and a known transmission signal; estimating a phase error of the received signal, which has been inputted, to the known transmission signal based on the received signal which has been inputted and the known transmission signal; and estimating response characteristic of the received signal, which has been inputted, to the known transmission signal by compensating a result of the correlation processing based on the estimated phase error.

The known transmission signal is included in a prescribed interval of the received signal in a sequential manner. This response characteristic estimation method further includes detecting an end of the sequential interval of the known transmission signal from the received signal which has been inputted. In this method, when estimating the response characteristic of the received signal, which has been inputted, to the known transmission signal, the result of the correlation processing may be compensated based on the estimated phase error at the detected end.

Still another preferred embodiment of the present invention relates to a program. This program includes: inputting a received signal; performing a correlation processing between the received signal which has been inputted and a known transmission signal; estimating a phase error of the received signal, which has been inputted, to the known transmission signal based on the received signal which has been inputted and the known transmission signal; and estimating response characteristic of the received signal, which has been inputted, to the known transmission signal by compensating a result of the correlation processing based on the estimated phase error.

The known transmission signal is included in a prescribed interval of the received signal in a sequential manner. This program further includes detecting an end of the sequential interval of the known transmission signal from the received signal which has been inputted. In this program, when estimating the response characteristic of the received signal, which has been inputted, to the known transmission signal, the result of the correlation processing may be compensated based on the estimated phase error at the detected end.

Still another preferred embodiment of the present invention relates to a receiver. This receiver includes: an input unit which inputs a plurality of received signals respectively; a correlation processor which performs correlation processings respectively between each of the plurality of received signals which have been inputted and a known transmission signal; a phase error estimator which estimates a phase error of at least one of the plurality of received signals, which have been inputted, to the known transmission signal based on at least one of the plurality of received signals, which have been inputted, and the known transmission signal; a phase error compensator which generates a plurality of weighting coefficients by compensating respectively a plurality of results of the correlation processings based on the estimated phase error; and a synthesizing unit which performs multiplications in a manner that the plurality of received signals which have been inputted respectively correspond to the plurality of weighting coefficients and synthesizes results of the multiplications.

The phase error estimator may estimate a conclusive phase error again by respectively estimating the phase error of each of the plurality of received signals, which have been inputted, to the known transmission signal based on the plurality of received signals which have been inputted and the known transmission signal and by averaging the estimated plurality of phase errors.

The known transmission signal is included in a prescribed interval of the received signal in a sequential manner. This receiver further includes a controller which detects an end of the sequential interval of the known transmission signal from the plurality of received signals which have been inputted. In this receiver, the phase error compensator may respectively compensate the plurality of results of the correlation processings based on the estimated phase errors at the detected end.

Still another preferred embodiment of the present invention relates to a receiving method. This receiving method includes: inputting a plurality of received signals respectively; performing correlation processings respectively between each of the plurality of received signals which have been inputted and a known transmission signal; estimating a phase error of at least one of the plurality of received signals, which have been inputted, to the known transmission signal based on at least one of the plurality of received signals, which have been inputted, and the known transmission signal; generating a plurality of weighting coefficients by compensating respectively a plurality of results of the correlation processings based on the estimated phase error; and synthesizing results of multiplications, wherein the multiplications are performed in a manner that the plurality of received signals which have been inputted respectively correspond to the plurality of weighting coefficients.

When estimating the phase error of at least one of the plurality of received signals, which have been inputted, to the known transmission signal, a conclusive phase error may be estimated again by respectively estimating the phase error of each of the plurality of received signals, which have been inputted, to the known transmission signal based on the plurality of received signals which have been inputted and the known transmission signal and by averaging the estimated plurality of phase errors.

The known transmission signal is included in a prescribed interval of the received signal in a sequential manner. This receiving method further includes detecting an end of the sequential interval of the known transmission signal from the plurality of received signals which have been inputted. In this method, when generating the plurality of weighting coefficients, the plurality of results of the correlation processings may be compensated respectively based on the estimated phase errors at the detected end.

Still another preferred embodiment of the present invention relates to a program. This program includes: inputting a plurality of received signals respectively; performing correlation processings respectively between each of the plurality of received signals which have been inputted and a known transmission signal; estimating a phase error of at least one of the plurality of received signals, which have been inputted, to the known transmission signal based on at least one of the plurality of received signals and, which have been inputted, the known transmission signal; generating a plurality of weighting coefficients by compensating respectively a plurality of results of the correlation processings based on the estimated phase error; and synthesizing results of multiplications, wherein the multiplications are performed in a manner that the plurality of received signals which have been inputted respectively correspond to the plurality of weighting coefficients.

When estimating the phase error of at least one of the plurality of received signals, which have been inputted, to the known transmission signal, a conclusive phase error may be estimated again by respectively estimating the phase error of each of the plurality of received signals, which have been inputted, to the known transmission signal based on plurality of received signals and the known transmission signal and by averaging the estimated plurality of phase errors.

The known transmission signal is included in a prescribed interval of the received signal in a sequential manner. This program further includes detecting an end of the sequential interval of the known transmission signal from the plurality of received signals which have been inputted. In this program, when generating the plurality of weighting coefficients, the plurality of results of the correlation processings may be compensated respectively based on the estimated phase errors at the detected end.

It is to be noted that any arbitrary replacement or substitution of the above-described structural components and the steps, expressions replaced or substituted in part or whole between a method and an apparatus as well as addition thereof, and expressions changed to a computer program, recording medium or the like are all effective as and encompassed by the present embodiments.

Moreover, this summary of the invention does not necessarily describe all necessary features so that the invention may also be sub-combination of these described features.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

FIRST EMBODIMENT

The first embodiment of the present invention relates to a receiver provided with an adaptive array antenna which receives radio signals with a plurality of antennas as burst signals and synthesizes the received signals with weighting them respectively by different weighting coefficients. The burst signal is composed of a known training signal which is disposed in the head part thereof and a data signal. The receiver according to the first embodiment, in a training signal interval, performs a correlation processing based on the training signal and the received signal and estimates frequency offset between frequency oscillators of a transmitter and the receiver. The correlation processing and the estimation of the frequency offset are performed in parallel. Initial response characteristics of the plurality of received signals to the transmission signal are acquired respectively by compensating the results of the correlation processings with the estimated frequency offset when the interval of the training signal ends. When the interval of data signal starts, the received signals are weighted and synthesized with having the initial response characteristics as the weighting coefficients. In the data signal interval, while the received signals are weighted with the weighting coefficients and synthesized, the weighting coefficients are updated by adaptive algorithm so that they might track a change in radio transmission environment.

Figure 1:
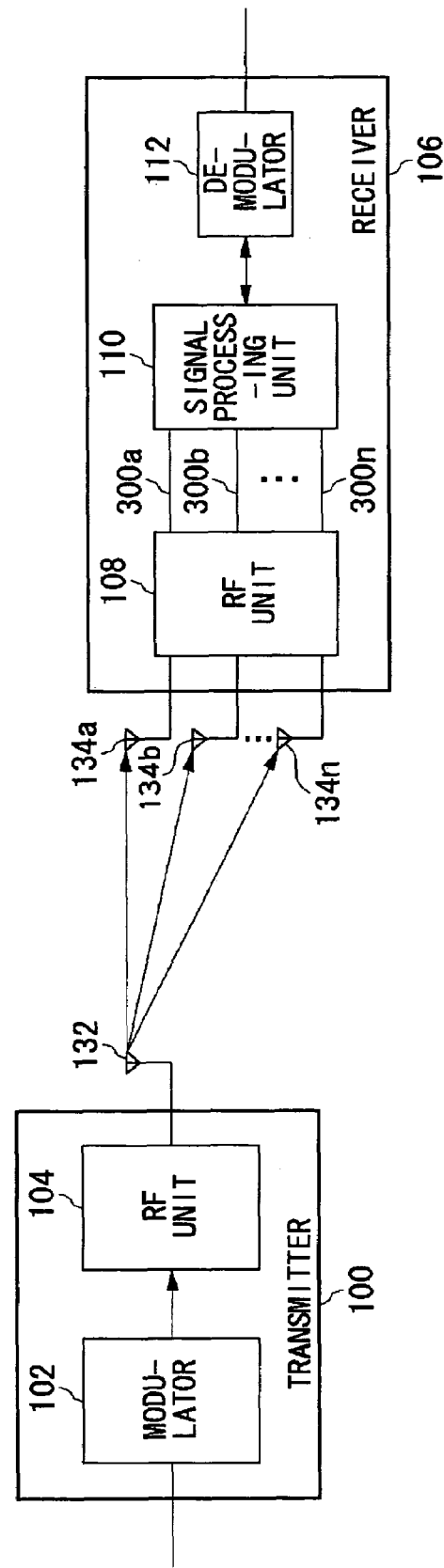
FIG. 1 shows a structure of a communication system according to a first embodiment of the present invention.

FIG. 1 shows a communication system including a transmitter 100 and a receiver 106 according to the first embodiment of the present invention. The transmitter 100 includes a modulator 102, a RF unit 104, and an antenna 132. The receiver 106 includes a first antenna 134a, a second antenna 134b, a n-th antenna 134n, a RF unit 108, a signal processing unit 110, and a demodulator 112. Here the first antenna 134a, the second antenna 134b and the n-th antenna 134n are generically named antennas 134.

The modulator 102 modulates an information signal to be transmitted and generates the transmission signal (hereinafter one signal included in the transmission signal is also called as a "symbol"). Any arbitrary modulation scheme may be utilized, such as QPSK (Quadri Phase Shift Keying), 16QAM (16 Quadrature Amplitude Modulation), GMSK (Gaussian filtered Minimum Shift Keying). In the following embodiments, examples are described where the QPSK is utilized. Moreover, in a case of a multi carrier communication, the transmitter 100 is provided with the plurality of modulators 102 or inverse Fourier transform units. In a case of a spectrum spreading communication, the modulator 102 is provided with a spreading unit.

The RF unit 104 translates the transmission signal into radio frequency signal. A frequency translation unit, a power amplifier, a frequency oscillator and so forth are included therein.

The antenna 132 of the transmitter 100 transmits the radio frequency signals. The antenna may have arbitrary directivity and the number of the antennas may also be arbitrary.

The antennas 134 of the receiver 106 receive the radio frequency signals. In this embodiment, the number of the antennas 134 is n. When it is described in this embodiment that the receiver has a n-th component thereof, it means that the number of the components provided to the receiver 106 is same as the number of the antennas 134, where the first, second, . . . n-th component basically performs same operation in parallel.

The RF unit 108 translates the radio frequency signals into baseband received signals 300. A frequency oscillator and so forth are provided to the RF unit 108. In a case of the multi carrier communication, the RF unit 108 is provided with a Fourier transform unit. In a case of the spectrum spreading communication, the RF unit 108 is provided with a despreading unit.

The signal processing unit 110 synthesizes the baseband received signals 330 with respectively weighting by the weighting coefficients and controls each weighting coefficient adaptively.

The demodulator 112 demodulates the synthesized signals and performs decision on the transmitted information signal. The demodulator 112 may also be provided with a delay detection circuit or a carrier recovery circuit for coherent detection.

Figure 2:
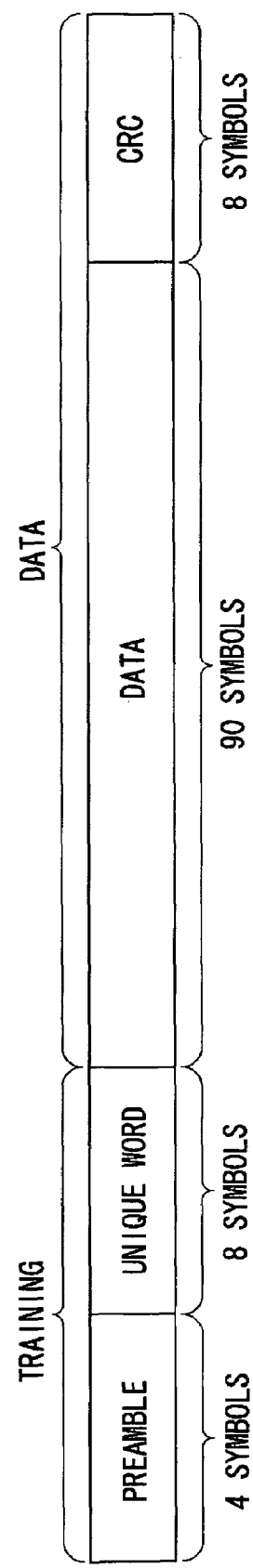
FIG. 2 shows a burst format according to the first embodiment of the present invention.
Figure 3:
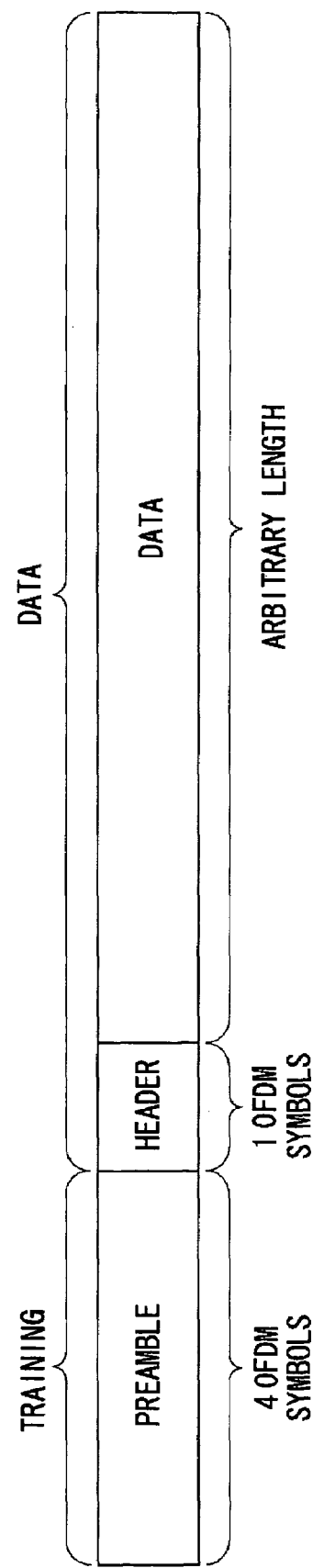
FIG. 3 shows a burst format according to the first embodiment of the present invention.

FIG. 2 and FIG. 3 show other burst formats respectively utilized in different communication systems corresponding to the communication system shown in FIG. 1. Training signals and data signals included in the burst signals are also shown in those figures. FIG. 2 shows a burst format utilized in a traffic channel of the Personal Handyphone System. A preamble is placed in initial 4 symbols of the burst, which is utilized for timing synchronization. The signals of the preamble and a unique word can serve as a known signal for the signal processing unit 110, therefore the signal processing unit 110 can utilize the preamble and the unique word as the training signal. Data and CRC both following after the preamble and the unique word are unknown for the signal processing unit 110 and correspond to the data signal.

FIG. 3 shows a burst format utilized in a traffic channel of the IEEE 802.11a, which is one type of wireless LAN (Local Area Network). The IEEE 802.11a employs OFDM (Orthogonal Frequency Division Multiplexing) modulation scheme. In the OFDM modulation scheme, the size of the Fourier transform and the number of the symbols of the guard interval are summated and the summation forms a unit. It is to be noted that this one unit is described as an OFDM symbol in this embodiment. A preamble is placed in initial 4 OFDM symbols of the burst, which is mainly utilized for timing synchronization and carrier recovery. The signals of the preamble can serve as a known signal for the signal processing unit 110, therefore the signal processing unit 110 can utilize the preamble as the training signal. Header and Data both following after the preamble are unknown for the signal processing unit 110 and correspond to the data signal.

Figure 4:
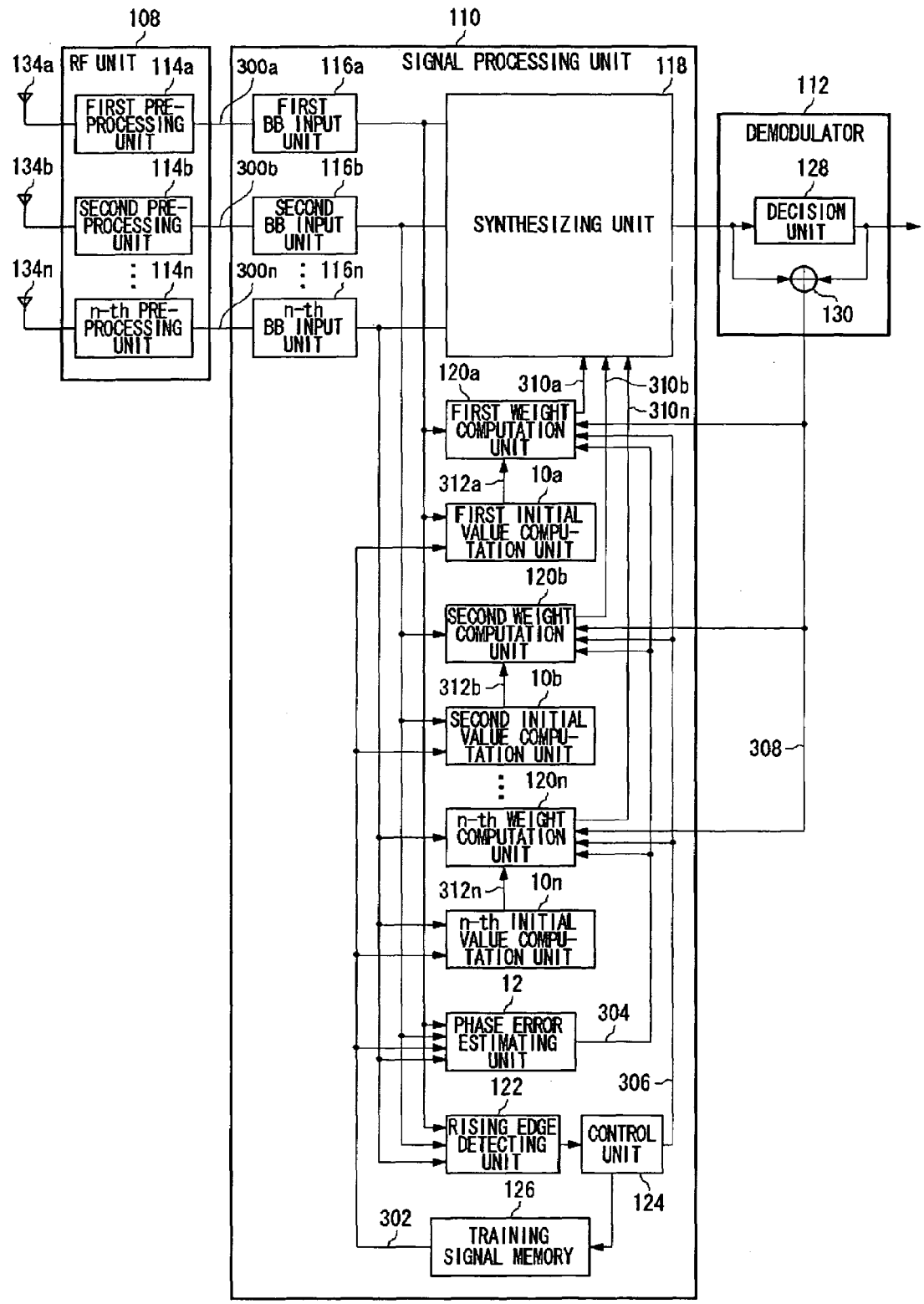
FIG. 4 shows a structure of a receiver according to the first embodiment of the present invention.

FIG. 4 shows a structure of the receiver 106 shown in FIG. 1. The RF unit 108 includes a first pre-processing unit 114a, a second pre-processing unit 114b, ... and a n-th pre-processing unit 114n, which are generically named pre-processing units 114. The signal processing unit 110 includes: a first BB input unit 116a, a second BB input unit 116b, ... and a n-th BB input unit 116n which are generically named BB input units 116; a synthesizing unit 118; a first weight computation unit 120a, a second weight computation unit 120b, ... and a n-th weight computation unit 120n which are generically named weight computation units 120; a rising edge detection unit 122; a control unit 124; a training signal memory 126; a first initial value computation unit 10a, a second initial value computation unit 10b, ... and a n-th initial value computation unit 10n which are generically named initial value computation units 10; and the phase error estimating unit 12. The demodulation unit 112 includes a decision unit 128 and a summing unit 130.

Moreover the signals utilized in the receiver 106 include: a first baseband received signal 300a, a second baseband received signal 300b, ... and n-th baseband received signal 300n which are generically named the baseband received signals 300; a training signal 302; a phase error signal 304; a control signal 306; an error signal 308; a first weighting coefficient 310a, a second weighting coefficient 310b, ... and a n-th weighting coefficient 310n which are generically named weighting coefficients 310; and a first correlation value 312a, a second correlation value 312b, ... and a n-th correlation value 312n which are generically named correlation values 312.

The pre-processing units 114 translate the radio frequency signals into the baseband received signals 300.

The BB input units 116 receives the baseband received signals 300. A baseband received signal $300xi(t)$ received by an i-th antenna is defined by the following (1)

$$x_i(t) = h_i S(t) exp(j\Delta\omega t) + n_i t \qquad (1)$$

Here, hi is the response characteristic of the radio interval, S(t) is the transmission signal, $\Delta\omega$ is the frequency offset between the frequency oscillators of the transmitter 100 and the receiver 106, and ni(t) is a noise.

The rising edge detection unit 122 detects the starts of the burst signals which serve as a trigger of the operation of the signal processing unit 110 from the baseband received signals 300. The timings of the detected starts of the burst signals are informed to the control unit 124. The control unit 124 computes timings when the interval of the training signal 302 ends, based on the timings of the starts of the burst signals. These timings are notified to each unit as control signals 306 in accordance with necessity.

The training signal memory 126 stores the training signal 302 and outputs the training signal in accordance with necessity.

The initial value computation units 10 compute the correlation value 312 within the interval of the training signal 302 by performing correlation processing on the baseband received signals 300 and the training signal 302. The delay of the processing can be reduced because the baseband signals 300 are inputted directly. The resulting correlation value 312Ci is given by:

$$C_i = h_i^* \Sigma \{exp(-j\Delta\omega t) S^*(t) S(t)\} + \Sigma \{n_i(t) S(t)\} \qquad (2)$$
$$= h_i^* \Sigma exp(-j\Delta\omega t)$$

Here, it is assumed that the average interval is sufficiently long and the term regarding the noise is ignored.

The phase error estimating unit 12, independent from the initial value computation units 10, estimates the frequency offset between the frequency oscillators of the transmitter 100 and the receiver 106 within the interval of the training signal 302, based on the baseband received signals 300 and the training signal 302. Then the phase error estimating unit 12 outputs the phase error deriving from the frequency offset as the phase error signal 304. The phase error signal 304PO is given by:

$$PO = \Sigma exp(-j\Delta\omega t) \qquad (3)$$

The weight computation units 120 acquire the initial weighting coefficients 310 when the interval of the training signal 302 ends, by compensating the correlation values 312 with the phase error signals 304. The initial weighting coefficient 310Wi is given by:

$$w_i = C_i/PO = h_i^* \qquad (4)$$

In the data signal interval, the initial weighting coefficients 310 are updated to new weighting coefficients 310. The LMS algorithm updates the weighting coefficients 310 based on baseband received signals 300 and the after-mentioned error signal 308.

The synthesizing unit 118 adds up the baseband received signals 300 after weighting them with the weighting coefficients 310. The summation result y(t) is given by:

$$y(t) = \Sigma w_i x_i(t) \tag{5}$$

The decision unit 128 decides the transmitted information signal by comparing the signal acquired by the summation to a pre-determined threshold value. The decision may be either hard or soft.

The summing unit 130 generates the error signal 308 based on the difference value between the synchronous detected signal and the decided signal, which is to be utilized in the LMS algorithm in the weight computation units 120. In an ideal situation, the error signal becomes zero since the LMS algorithm controls the weighting coefficients 310 so that the error signal 308 might become small.

Figure 5:
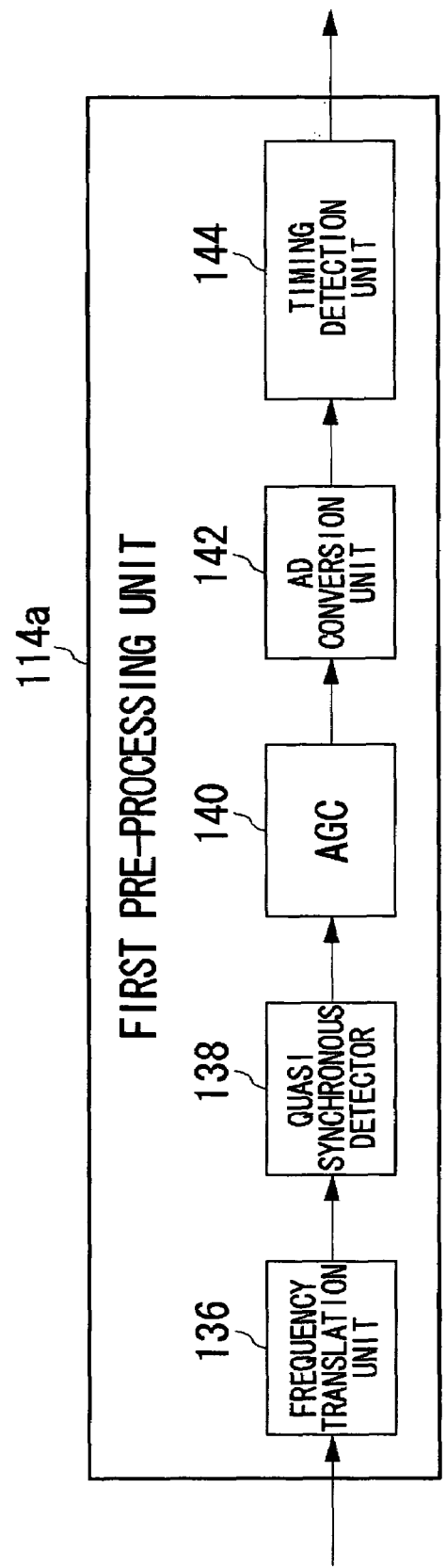
FIG. 5 shows a structure of a first pre-processing unit shown in FIG. 4.
Figure 6:
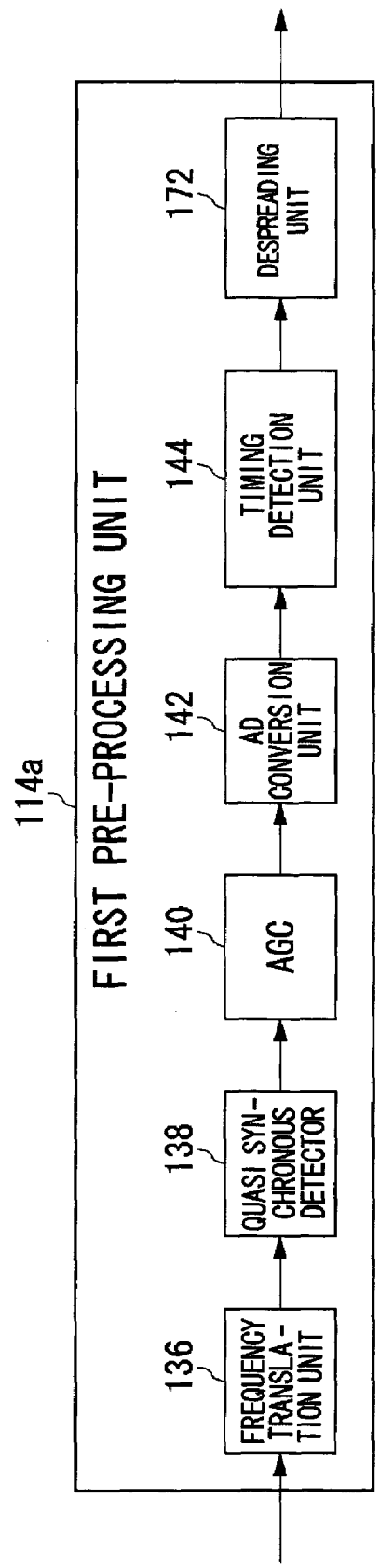
FIG. 6 shows a structure of the first pre-processing unit shown in FIG. 4.
Figure 7:
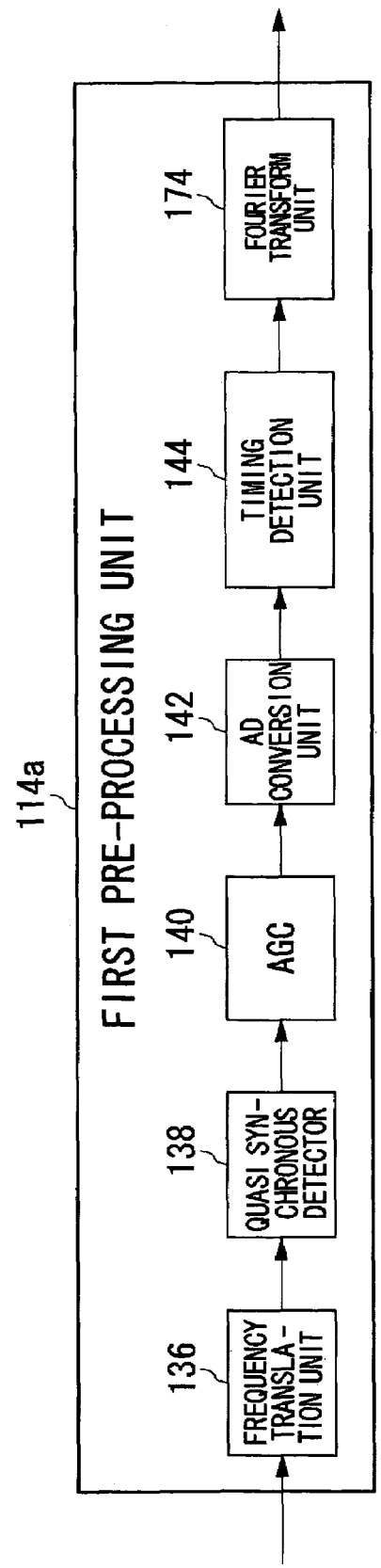
FIG. 7 shows a structure of the first pre-processing unit shown in FIG. 4.

FIG. 5 to FIG. 7 show various structures of the first pre-processing unit 114a. The first pre-processing unit 114a in the receiver 106 can accept and treat various signals in different communication systems such as shown in FIG. 2 or FIG. 3, therefore the signal processing unit 110 following thereafter can operate ignoring the difference of the communication systems. The first pre-processing unit 114a in FIG. 5 is for the single carrier communication system shown in FIG. 2 such as Personal Handyphone System, cellular phone system or the like. The first pre-processing unit 114a in FIG. 5 includes a frequency translation unit 136, a quasi synchronous detector 138, an AGC (Automatic Gain Control) 140, an AD conversion unit 142, and a timing detection unit 144. The first pre-processing unit 114a shown in FIG. 6 is for the spectrum spreading communication system such as the W-CDMA (Wideband-Code Division Multiple Access) or the wireless LAN implemented in relation to the IEEE 802.11b. In addition to the first pre-processing unit 114a shown in FIG. 5, that shown in FIG. 6 further includes a despreading unit 172. The first pre-processing unit 114a is for the multi carrier communication system shown in FIG. 3 such as the IEEE 802.11a or the Hiper LAN/2. In addition to the first pre-processing unit 114a shown in FIG. 6, that shown in FIG. 7 further includes a Fourier transform unit 174.

The frequency translation unit 136 translates the radio frequency signal into one intermediate frequency signal, a plurality of intermediate frequency signals or other signals. The quasi synchronous detector 138 performs quadrature detection on the intermediate frequency signal utilizing a frequency oscillator and generates a baseband analog signal. Since the frequency oscillator included in the quasi synchronous detector 138 operates independently from the frequency oscillator provided to the transmitter 100, the frequencies between the two oscillators differ from each other.

The AGC 140 automatically controls gains so that the amplitude of the baseband analog signal might become an amplitude within the dynamic range of the AD conversion unit 142.

The AD conversion unit 142 converts the baseband analog signal into a digital signal. Sampling interval for converting the baseband analog signal to the digital signal is generally set to be shorter than symbol interval in order to constrict the degradation of the signal. Here, the sampling interval is set to the half of the symbol interval (Hereinafter, the signal digitalized with this sampling interval is referred to as a "high speed digital signal").

The timing detection unit 144 selects a baseband received signal 300 of an optimal sampling timing from the high speed digital signals. Alternatively, the timing detection unit 144 generates the baseband received signal 300 having the optimal sampling timing by performing a synthesis processing or the like on the high speed digital signals.

The despreading unit 172 shown in FIG. 6 performs correlation processing on the baseband received signal 300 based on a predetermined code series. The Fourier transform unit 174 in FIG. 7 performs the Fourier transform on the baseband received signal 300.

Figure 8:
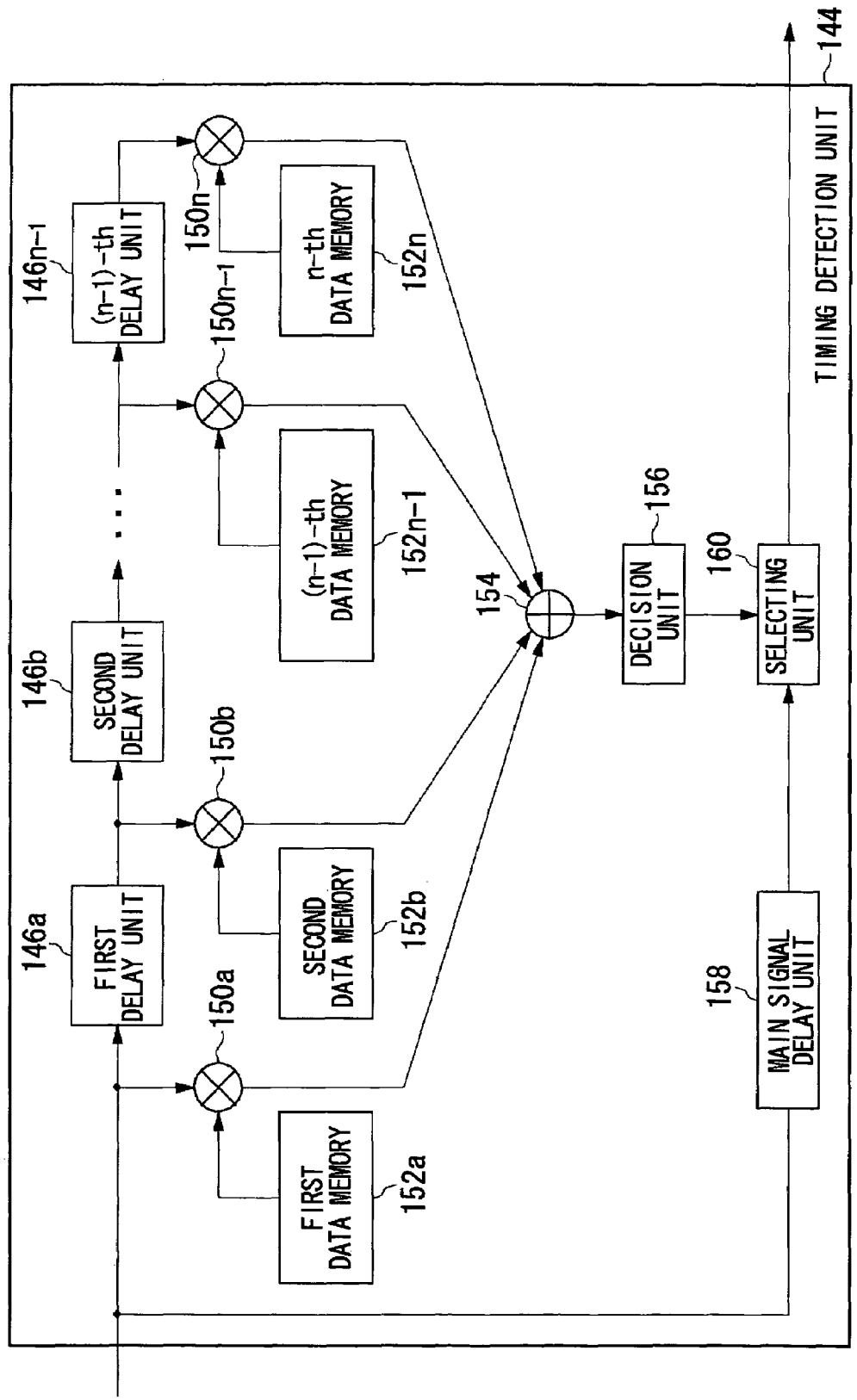
FIG. 8 shows a structure of a timing detection unit shown in FIGS. 5, 6 and 7.

FIG. 8 shows the structure of the timing detection unit 144. The timing detection unit 144 includes: a first delay unit 146a, a second delay unit 146b, . . . and a (n-1)-th th delay unit 146n-1 which are generically named delay units 146; a first multiplication unit 150a, a second multiplication unit 150b, a (n-1)-th multiplication unit 150n-1, . . . and a n-th multiplication unit 150n which are generically named multiplication units 150; a first data memory 152a, a second data memory 152b, a (n-1)-th data memory 152n-1, . . . a n-th data memory 152n which are generically named data memories 152; a summing unit 154; a decision unit 156; a main signal delay unit 158; and a selecting unit 160.

The delay units 146 delay the inputted high speed digital signal for the correlation processing. The sampling interval of the high speed digital signal is set to half of the symbol interval. However the delay quantity of the delay units 146 is set to the symbol interval, therefore the high speed digital signal 150 is outputted from every other delay unit 146 to the multiplication units 150.

The data memories 152 store 1 symbol of each preamble signal for the timing synchronism.

The multiplication units 150 perform multiplications on the high speed digital signals and the preamble signals, and the results thereof are summed up by the summing unit 154.

The decision unit 156 selects an optimal sampling timing based on the result of the summation. The sampling interval of the high speed digital signal is half of the symbol signal and the interval of the high speed digital signal utilized for the summation is equal to the symbol interval, therefore there are two types of the summation results for every other high speed digital signal corresponding to each shifted sampling timing. The decision unit 156 compares the two types of the summation results and decides a timing corresponding to larger summation result as the optimal sampling timing. This decision should not necessarily be made by comparing the two types of the summation results once, but may be made by comparing them for several times.

The main signal delay unit 158 delays the high speed digital signal until the optimal sampling timing is determined by the decision unit 156.

The selecting unit 160 selects a baseband received signal 300 corresponding to the optimal sampling timing from the high speed digital signals. Here one high speed digital signal is selected sequentially from the two successive high digital speed signals.

Figure 9:
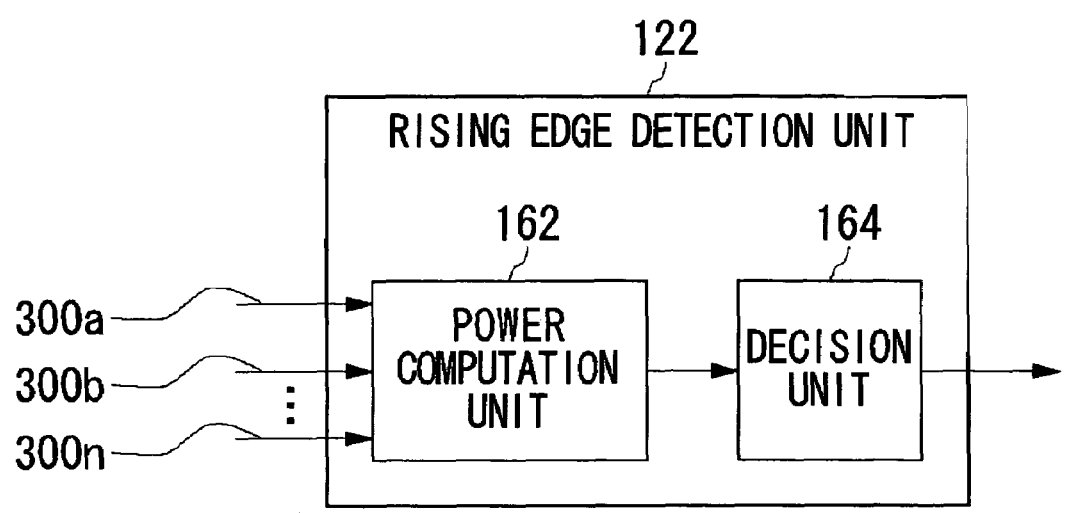
FIG. 9 shows a structure of a rising edge detection unit shown in FIG. 4.

FIG. 9 shows the structure of the rising edge detection unit 122 included in the signal processing unit 110. The rising edge detection unit 122 includes a power computation unit 162 and a decision unit 164. The power computation unit 162 computes the received power of each baseband received signal 300 and then sums up the received power of each baseband received signal to acquire the whole power of the signals which are received by all the antennas 134.

The decision unit 164 compares the whole received power of the signals with a predetermined condition and decides that the start of the burst signal is detected when the condition is satisfied.

Figure 10:
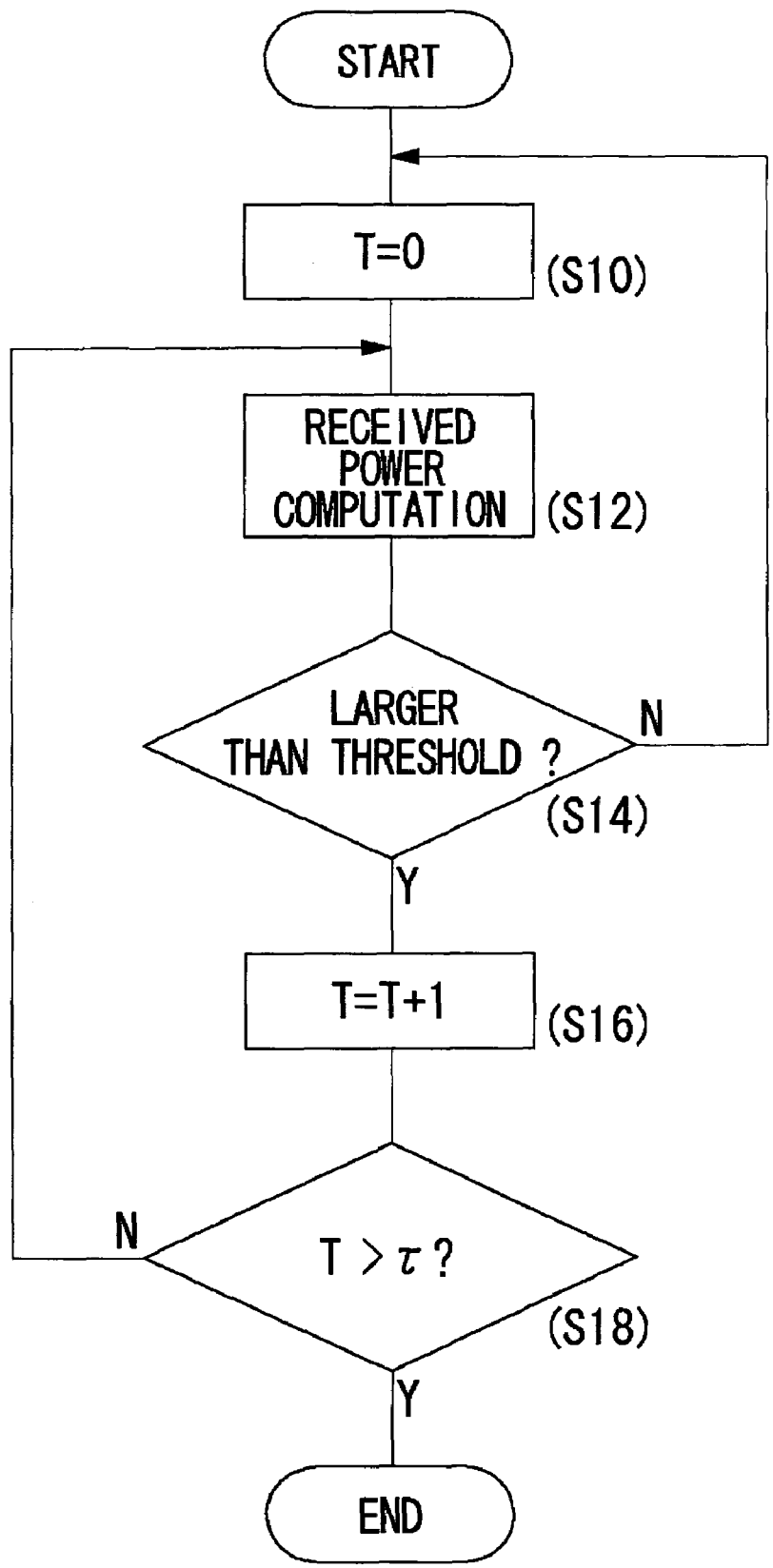
FIG. 10 shows an operation procedure of the rising edge detection unit shown in FIG. 9.

FIG. 10 shows the operation of the rising edge detection unit 122. The decision unit 164 sets an internal counter T to zero (S10). The power computation unit 162 computes the received power from the baseband received signals 300 (S12). The determination unit 164 compares the received power with a threshold value. When the received power is larger than the threshold value (Y in S14), the decision unit 164 adds 1 to the T (S16). When the T becomes larger than a predetermined value τ (Y in S18), it is decided that the start of the burst signal is detected. The processing described-above is repeated until the start of the burst signal is detected (N in S14, N in S18).

Figure 11:
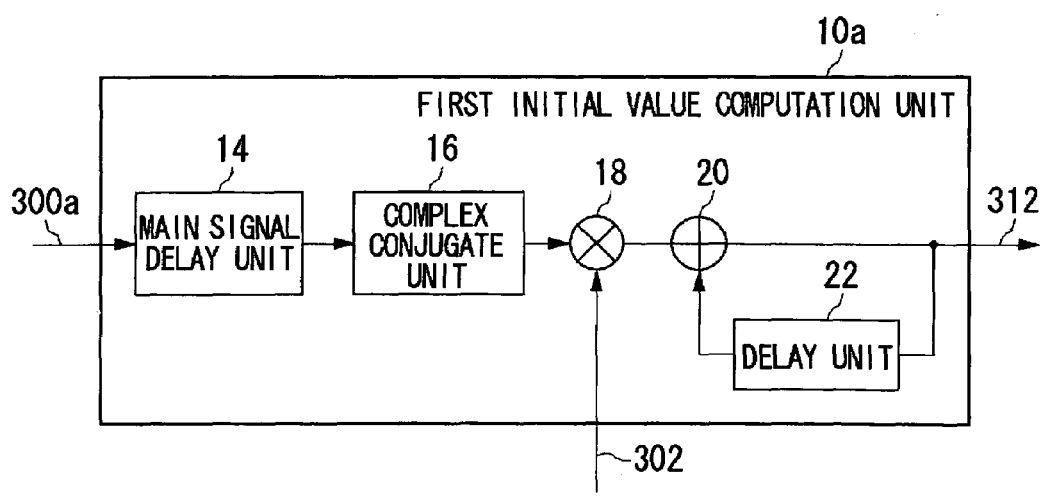
FIG. 11 shows a structure of a first initial value computation unit shown in FIG. 4.

FIG. 11 shows the structure of the first initial value computation unit 10a. The first initial value computation unit 10a includes a main signal delay unit 14, a complex conjugate unit 16, a multiplication unit 18, a summing unit 20 and a delay unit 22.

The main signal delay unit 14 delays the first baseband received signal 300a so that the first baseband received signal 300a might synchronize with the timing detected by the rising edge detection unit 122. The complex conjugate unit 16 transforms the first baseband received signal 300a to a complex conjugate. The multiplication unit 18 multiplies the first baseband received signal 300a in the complex conjugate by the training signal 302.

By the summing unit 20 and the delay unit 22, the results of the multiplications between the first baseband received signal 300a and the training signal 302 are integrated in the training signal 302 interval and the error signal 308 is acquired.

Figure 12:
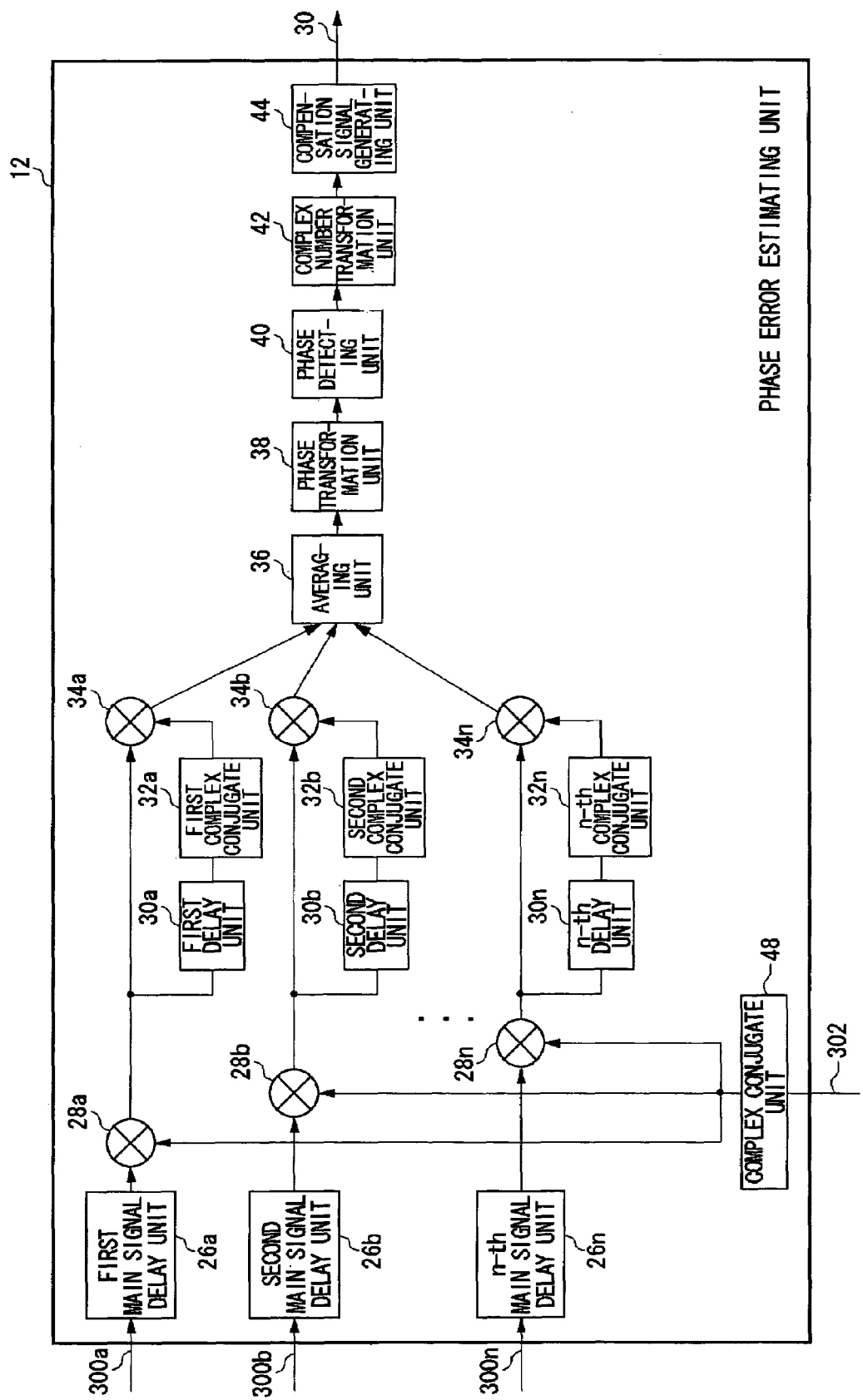
FIG. 12 shows a structure of a phase error estimating unit shown in FIG. 4.

FIG. 12 shows the structure of the phase error estimating unit 12. The phase error estimating unit 12 includes: a first main signal delay unit 26a, a second main signal delay unit 26b, . . . and a n-th main delay unit 26n which are generically named main signal delay units 26; a first multiplication unit 28a, a second multiplication unit 28b, . . . and a n-th multiplication unit 28n which are generically named multiplication units 28; a first delay unit 30a, a second delay unit 30b, . . . and a n-th delay unit 30n which are generically named main delay units 30; a first complex conjugate unit 32a, a second complex conjugate unit 32b, . . . and a n-th complex conjugate unit 32n which are generically named complex conjugate units 32; a first multiplication unit 34a, a second multiplication unit 34b, . . . and n-th multiplication unit 34 which are generically named multiplication units 34; an averaging unit 36, a phase transformation unit 38; a phase detecting unit 40; a complex number transformation unit 42; a compensation signal generating unit 44; and a complex conjugate unit 48.

The multiplication units 28 acquires a received signal Zi(t) which does not include transmission signal component by multiplying the baseband received signals 300 delayed in the main signal delay units 26 by the training signal 302 after the complex conjugate transform. The received signal Zi(t) is given by:

$$Z_i(t) = x_i(t) S^*(t) \quad (6)$$
$$= h_i \exp(j\Delta\omega t)$$

Here, it is assumed that a noise is sufficiently small and therefore the noise is ignored.

The delay units 30 and the complex conjugate units 32 delay the Zi(t) and then transform the Zi(t) to the complex conjugate. The Zi(t) transformed to the complex conjugate is multiplied by the original Zi(t) in the multiplication units 34. The result Ai of the multiplication is given by:

$$A_i(t) = Z_i(t) Z_i^*(t - 2T) \quad (7)$$
$$= \exp(j2\Delta\omega t)$$

Here, the delay time of the delay units 30 is set to 2T, wherein T is the symbol interval.

The averaging unit 36 averages the multiplication results corresponding to each antenna. The multiplication results of which the time is shifted may also be utilized.

The phase transformation unit 38 transforms the averaged multiplication result A to a phase signal B by utilizing an arc tangent ROM.

$$B = 2\Delta\omega T \quad (8)$$

The phase detecting unit 40 converts the phase signal B to a phase error C of the symbol interval.

$$C = \Delta\omega T \quad (9)$$

The complex number transformation unit 42 transforms the phase error C to the complex number again by utilizing a cosine ROM or a sine ROM. The compensation signal generating unit 44 computes the phase error signal 304PO given by above-mentioned (3) based on the phase error of the symbol interval represented by the complex number.

Figure 13:
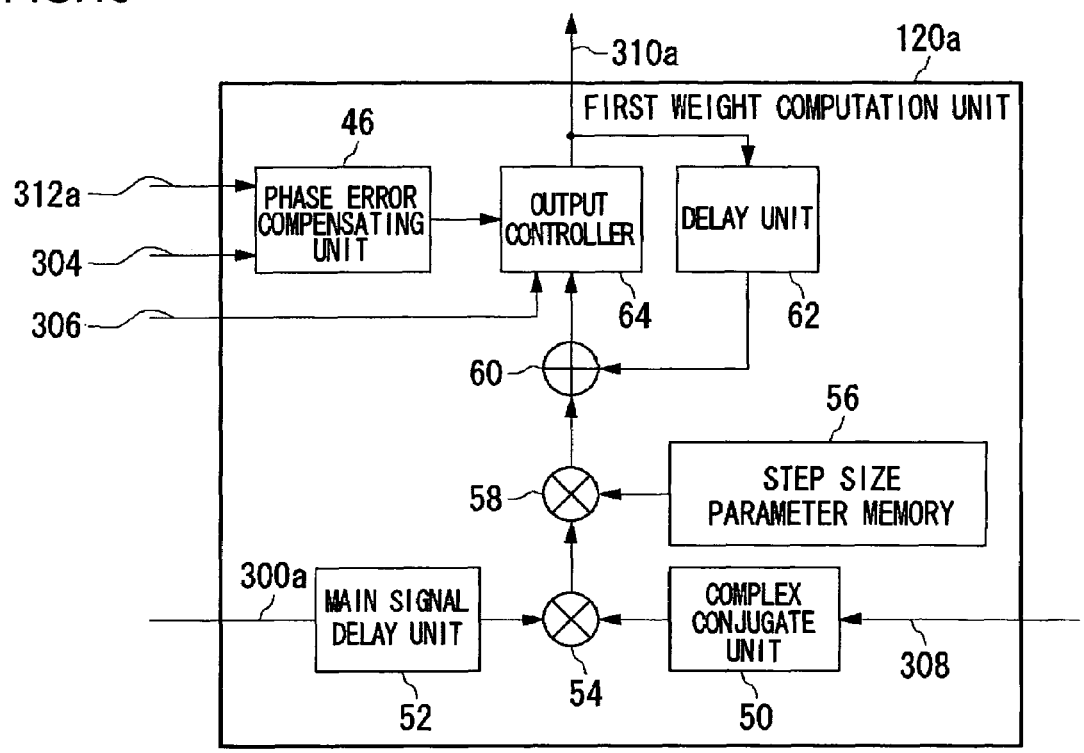
FIG. 13 shows a structure of a first weight computation unit shown in FIG. 4.

FIG. 13 shows the structure of the first weight computation unit 120a. The first weight computation unit 120a includes a phase error compensating unit 46, a complex conjugate unit 50, a main signal delay unit 52, a multiplication unit 54, a step size parameter memory 56, a multiplication unit 58, a summing unit 60, a delay unit 62 and an output controller 64.

The phase error compensating unit 46, when the interval of the training signal 302 ends, performs division and acquires the initial first weighting coefficient 310a by compensating the first correlation value 312a with the phase error signal 304.

The multiplication unit 54 generates a first multiplication result by multiplying the phase error 308 after complex conjugate transform in the complex conjugate unit 50 by the first baseband received signal 300a delayed by the main signal delay unit 52.

The multiplication unit 58 generates a second multiplication result by multiplying the first multiplication result by a step size parameter stored in the step size parameter memory 56. The second multiplication result is fed back by the delay unit 62 and the summing unit 60 and added to a new second multiplication result. The result of the summation is then sequentially updated by the LMS algorithm. This summation result is outputted as the first weighting coefficient 310a.

The output controller is a switch which updates the inputs of the plurality of signals. When the interval of the training signal 302 ends, the initial weighting coefficient 310a from the phase error compensating unit 46 is inputted into the output controller 64 and is outputted from the first weight computation unit 120a. In the data interval, the output controller 64 inputs the summation result by the summing unit 60 and then outputs the summation result as the first weighting coefficient 310a.

Figure 14:
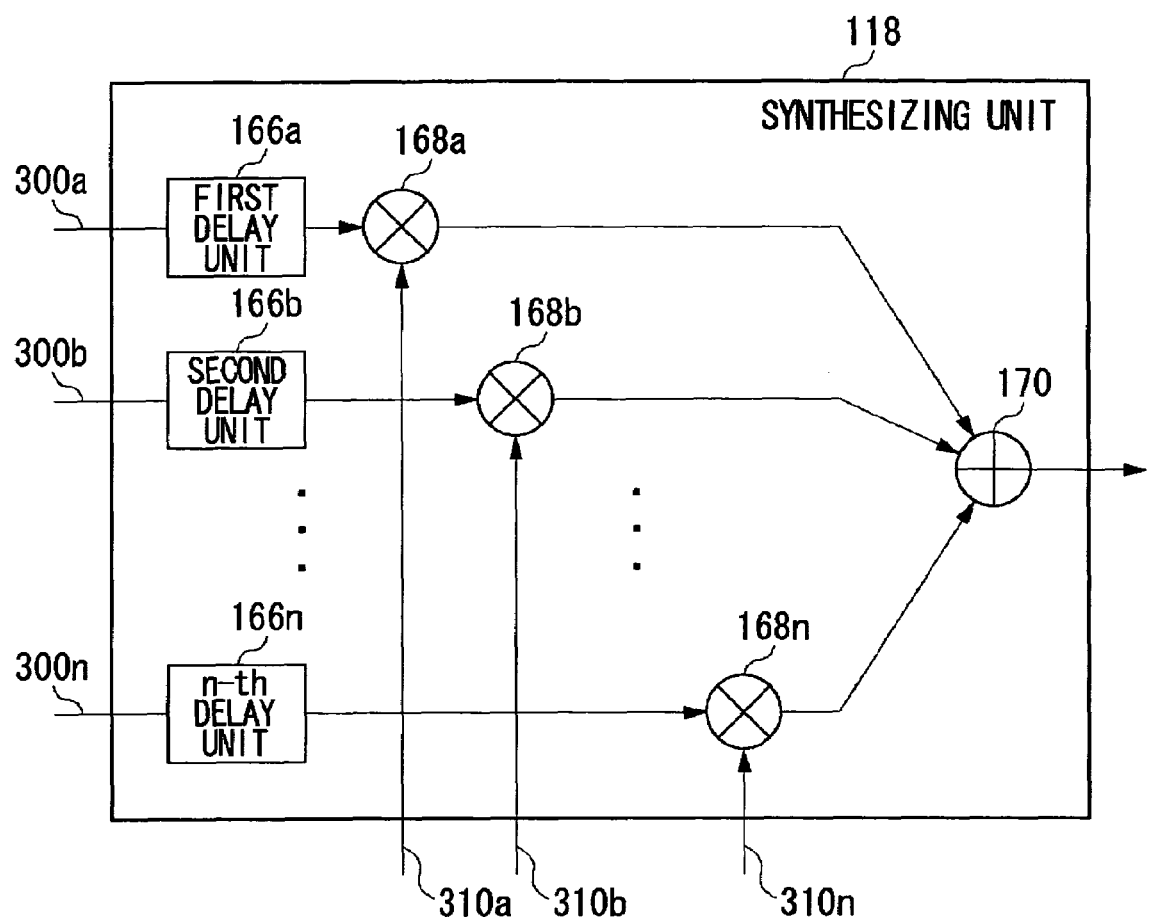
FIG. 14 shows a structure of a synthesizing unit shown in FIG. 4.

FIG. 14 shows the structure of the synthesizing unit 118 which is included in the signal processing unit 110. The synthesizing unit 118 includes: a first delay unit 166a, a second delay unit 166b, . . . and a n-th delay unit 166n which are generically named delay units 166; a first multiplication unit 168a, a second multiplication unit 168b, . . . and a n-th multiplication unit 168n which are generically named multiplication units 168; and a summing unit 170.

The multiplication units 168 multiply the baseband received signals 300 which are delayed by the delay units 166 by the weighting coefficients 310. The summing unit 170 adds up whole results of the multiplications.

Hereunder will be described the operation of the receiver 106 having the structure described above. The signals received by the plurality of antennas 134 are translated to the baseband received signals 300 by the quadrature detection and so forth. When the rising edge detection unit 122 detects the starts of the burst signals from the baseband received signals 300, the interval of the training signal 302 is started. In the interval of the training signal 302, the initial value computation units 10 perform the correlation processing between the baseband received signals 300 and the training signal 302 and the phase error estimating unit 12 simultaneously estimates the error between the baseband received signal 300 and the training signal 302.

When the interval of the training signal 302 ends, the phase error compensating unit 46 compensates the correlation values 312 outputted from the initial value computation units 10 by utilizing the phase error signal 304 outputted from the phase error estimating unit 12 and then generates the initial weighting coefficients 310. When the interval of the data signal starts, the synthesizing unit 118 sums up the baseband received signals 300 with weighting by the initial weighting coefficients 310. In the interval of the data signal, the weight computation units 120 update the weighting coefficients 310 from the initial weighting coefficients 310 repeatedly based on the baseband received signals 300 and the error signal 308. The synthesizing unit 118 adds up the baseband received signals 300 with weighting by the updated weighting coefficients 310.

According to the first embodiment, this apparatus can be structured with simple arithmetic circuits. Moreover, correlation processing for estimating the initial weighting coefficients and the processing for estimating frequency offset are performed in parallel and results of these processings are not utilized in the other processing, therefore the processing delay can be reduced. The degradation of the estimation accuracy caused by the frequency offset between frequency oscillators can also be reduced.

SECOND EMBODIMENT

In the second embodiment, in the interval of training signal, which is included in the received signals same as in the first embodiment, the frequency offset between the frequency oscillators of the transmitter and the receiver is estimated. In the first embodiment, the frequency offset was estimated after the signal component of the training signal is eliminated from the received signal. On the other hand, in the second embodiment, where the training signal is structured by repeating signal series which has shorter frequency than the training signal, the frequency offset is estimated between same signals which appear in a cyclic manner because of the repetition. Therefore, it is not required to eliminate the signal component of the training signal from the received signal and the multiplication unit for the elimination becomes unnecessary.

Figure 15:
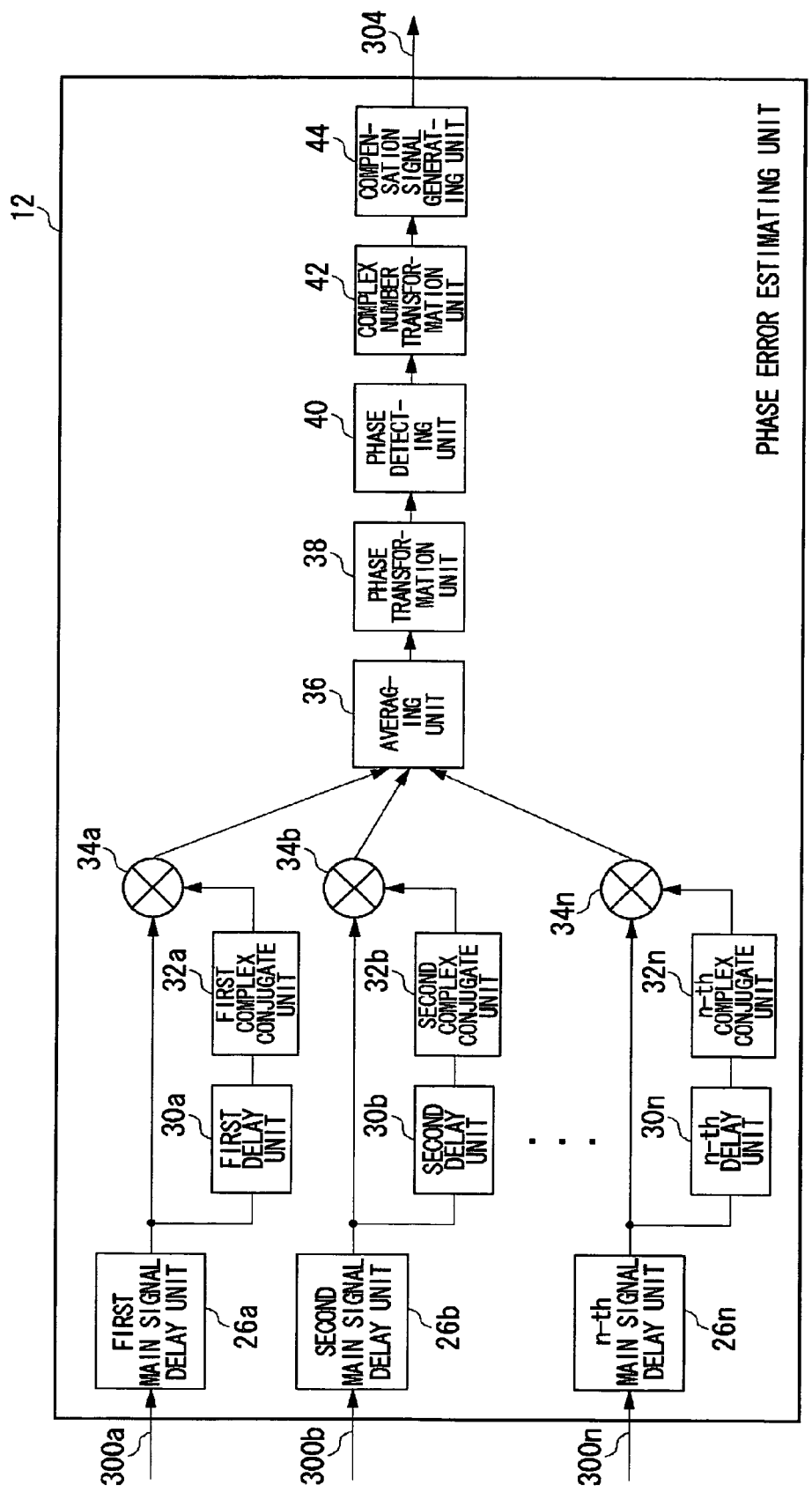
FIG. 15 shows a structure of a phase error estimating unit according to a second embodiment of the present invention.

FIG. 15 shows the structure of a phase error estimating unit 12 according to the second embodiment. The phase error estimating unit 12 shown in FIG. 15, unlike with the phase error estimating unit 12 shown in FIG. 12, is not provided with the first multiplication unit 28a, the second multiplication unit 28b, . . . and the n-th multiplication unit 28n. In the second embodiment, the signals multiplied by the multiplication unit 34 must have the same transmission signals. This can be satisfied by setting the delay quantity of the delay units 30 to a suitable value. In the burst format shown in FIG. 2, since the preamble is structured by alternate code, each 2 symbols comes to have a same value. Therefore, the delay units 30 are set to delay the baseband received signals 300 by 2 symbols. The delay quantity of the delay units 30 is set to 1 OFDM symbols in the interval, where each 1 OFDM symbols has a same value, of the burst format shown in FIG. 3. On the other hand, the delay quantity of the delay units 30 is set to ⅕ OFDM symbol in the interval where each ⅕ OFDM symbol has a same value.

According to the second embodiment, the frequency offset can be estimated without eliminating the component of the transmission signal from the received signal, therefore the size of arithmetic circuits can be diminished.

THIRD EMBODIMENT

In the third embodiment, same as in the first embodiment and the second embodiment, the frequency offset between the frequency oscillators of the transmitter and the receiver is estimated. In the first and second embodiments, the frequency offset is estimated in a time axis based on the signal acquired by delaying the received signal and the received signal in the interval of the training signal. On the other hand, in the third embodiment, the received signal is converted by the Fourier transform and the frequency offset is estimated in a frequency axis based on the received signal in a frequency space. By transforming the received signal to the signal in the frequency space, the frequency offset can be estimated both in the cases where the received signal is the training signal and the received signal is the data signal. As a result, the frequency offset can be estimated more accurately in longer time than the interval of the training signal.

Figure 16:
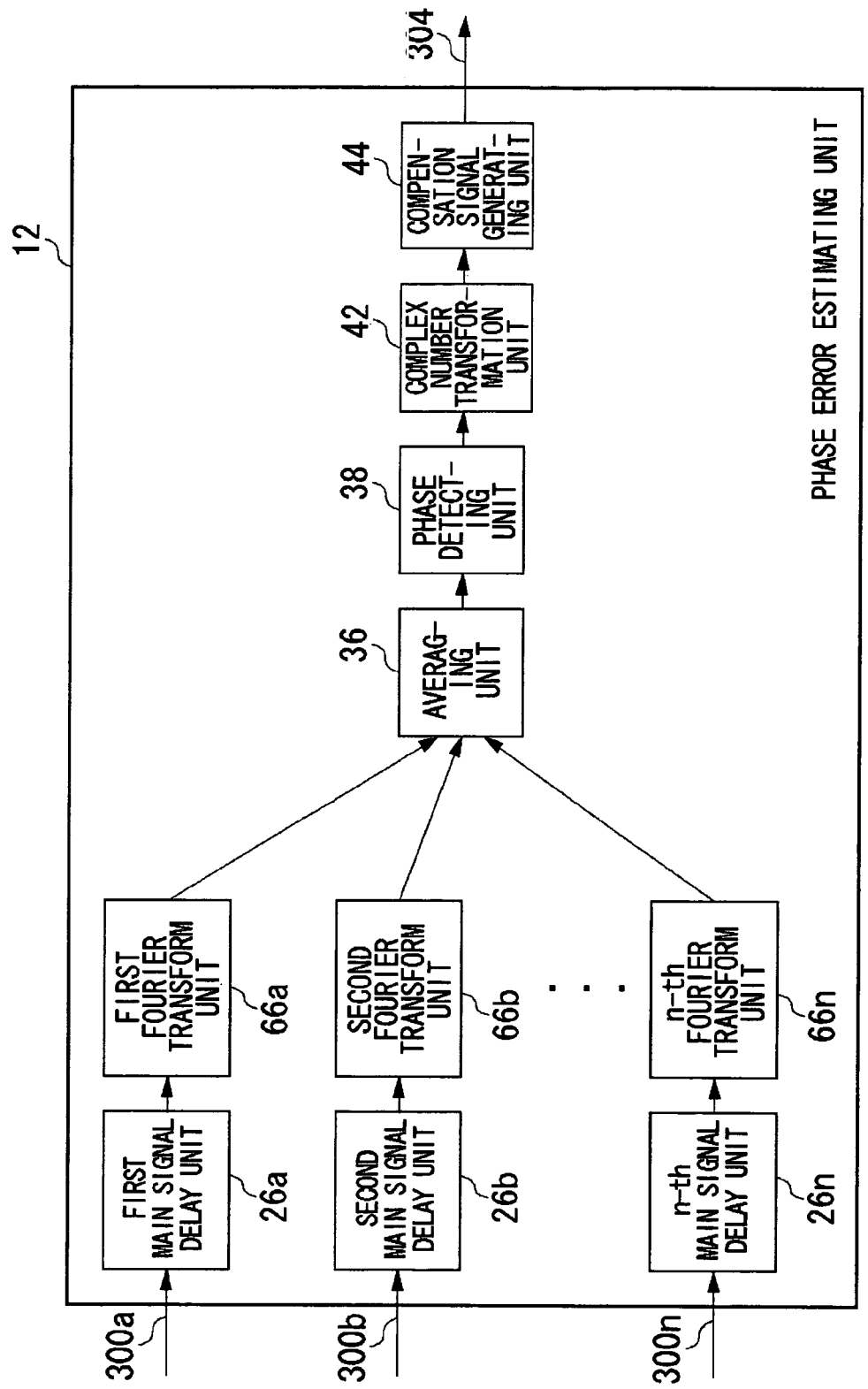
FIG. 16 shows a structure of a phase error estimating unit according to a third embodiment of the present invention.

FIG. 16 shows the structure of a phase error estimating unit 12 according to the third embodiment. The phase error estimating unit 12 includes: a first main signal delay unit 26a, a second main signal delay unit 26b, . . . and a n-th main signal delay unit 26n which are generically named main signal delay units 26; a first Fourier transform unit 66a, a second Fourier transform unit 66b, . . . and a n-th Fourier transform unit 66n which are generically named Fourier transform units 66; an averaging unit 36; a phase conversion unit 38; a complex number transformation unit 42; and a compensated signal generating unit 44.

The Fourier transform units 66 perform the Fourier transform of the baseband received signals 300 delayed by the main signal delay units 26 and output the signals in the frequency space. The averaging unit 36 performs averaging processing on these signals in the frequency space and then the phase transformation unit 38 detects the peak of the power or amplitude of the signal acquired by the averaging processing. It is estimated that the frequency value corresponding to the peak is the frequency offset between the frequency oscillators of the transmitter 100 and the receiver 106. The succeeding processings are same as those of the phase error estimating unit 12 in FIG. 14.

According to the third embodiment, the frequency offset can be estimated more accurately because the offset can be estimated in the time longer than the interval or the training signal.

Although the present invention has been described by way of exemplary embodiments, it should be understood that many changes and substitutions may be made by those skilled in the art without departing from the scope of the present invention which is defined by the appended claims.

In the embodiments described above, the signal processing unit 110 is utilized for synthesizing received signals in the adaptive array antenna. The signal processing unit 110 may, however, be utilized for another processing. For example, the signal processing unit 110 may be applied to an adaptive equalizer. In that case, the synthesizing unit 118 comes to have a structure that, similar to a FIR filter, one received signal is delayed by a plurality of delay elements and the plurality of delayed received signals are synthesized after multiplying them by a plurality of weighting coefficients. This is different from the structure of the synthesizing unit 118 shown in the above-described embodiments. The signal processing unit 110 may be applied to a carrier recovery circuit. In that case, the synthesizing unit 118 is provided with only one multiplication unit 168. That is, the signal processing unit 110 can be applied to a case where there arise the phase error from the correlation processing.

In the embodiments described above, the weight computation units 120 utilize the LMS algorithm as the adaptive algorithm. However, another algorithm such as the RLS algorithm may be utilized. Moreover, the weighting coefficients do not necessarily need to be updated. That is, the adaptive algorithm may be selected in accordance with assumed radio transmission environment, the size of arithmetic circuits or the like.

In the first embodiment, the phase error estimating unit 12 includes the delay units 30 and the multiplication units 34. The phase error estimating unit 12, however, does not solely necessarily utilize the delay units 30 and the multiplication units 34. For example, the delay units 30 and the multiplication units 34 may be utilized by both the phase error estimating unit 12 and an AFC (Automatic Frequency Control). The whole size of the circuits can be diminished by utilizing one circuit in common.

In the first embodiment, the rising edge detection unit 122 computes the electric power of the baseband received signals 300 and detects the rising edge of the burst signal based on the computation result. The rising edge of the burst signal may be, however, detected by implementing another structure. For example, the rising edge may be detected by a matched filter which is shown as the structure of the timing detection unit 144. That is, it is sufficient if the rising edge of the burst signal is detected accurately.

In the first embodiment, the delay time of the delay units 30 which are included in the phase error estimating unit 12 is set to 2 symbols. The delay time, however, is not limited to 2 symbols. For example, the delay time may be 1 symbol or may be symbols in the interval between the start and end of the training signal. That is, it is sufficient if an optimum delay time of the delay units 30 is decided in accordance with the stability of the frequency oscillator and with the required accuracy of the frequency offset estimation.

In the first embodiment, the time where the initial value computation units 10 or the phase error estimating unit 12 performs the processing was the interval of the training signal. However, the time does not need to be limited to the interval of the training signal. For example, the time may by shorter than the interval of the training signal. That is, the time can be set according to the length of the interval of the training signal and to the required estimation accuracy.

What is claimed is:

1. A response characteristic estimation apparatus, including:
   an input unit which inputs a burst signal including a training signal as a received signal;
   a correlation processor which performs, in a training signal interval, a correlation processing between the received signal which has been inputted and the training signal;
   a phase error estimator which estimates a phase error of the received signal, which has been inputted, in the training signal interval, and in parallel with the processing in the correlation processor; and
   a phase error compensator which estimates, at the end of the training signal interval, response characteristic of the received signal, which has been inputted, to the training signal by compensating for a result of the correlation processing based on the estimated phase error.

2. The response characteristic estimation apparatus according to claim 1, wherein the training signal is included in a prescribed interval in the burst signal in a sequential manner, and wherein the apparatus further includes a controller which detects an end of the sequential interval of the training signal from the received signal which has been inputted, and the phase error compensator compensates the result of the correlation processing based on the estimated phase error at the detected end.

3. A response characteristic estimation method, including:
   inputting a burst signal including a training signal as a received signal;
   performing, in a training signal interval, a correlation processing between the received signal which has been inputted and the training a signal;
   estimating a phase error of the received signal, which has been inputted, in the training signal interval, and in parallel with the correlation processing; and
   estimating, at the end of the training signal interval, response characteristic of the received signal, which has been inputted, to the training signal by compensating for a result of the correlation processing based on the estimated phase error.

4. The response characteristic estimation method according to claim 3, wherein the training signal is included in a prescribed interval in the burst signal in a sequential manner, and wherein the method further includes detecting an end of the sequential interval of the training signal from the received signal which has been inputted, and in estimating the response characteristic of the received signal, which has been inputted, to the training signal, the result of the correlation processing is compensated based on the estimated phase error at the detected end.

5. A product comprising a recording medium having a computer program for causing a processing unit to perform steps of:
   inputting a burst signal including a training signal as a received signal;
   performing, in a training signal interval, a correlation processing between the received signal which has been inputted and the training a signal;
   estimating a phase error of the received signal, which has been inputted, in the training signal interval, and in parallel with the correlation processing; and
   estimating, at the end of the training signal interval, response characteristic of the received signal, which has been inputted, to the training signal by compensating for a result of the correlation processing based on the estimated phase error.

6. The product comprising a recording medium having a computer program according to claim 5, wherein the training signal is included in a prescribed interval in the burst signal in a sequential manner, and wherein the program stored in the recording medium further includes detecting an end of the sequential interval of the training signal from the received signal which has been inputted, and in estimating the response characteristic of the received signal, which has been inputted, to the training signal, the result of the correlation processing is compensated based on the estimated phase error at the detected end.

7. A receiver, including:
an input unit which inputs burst signals including training signals as a plurality of received signals respectively;
a correlation processor which performs, in a training signal interval, correlation processings respectively between each of the plurality of received signals which have been inputted and a training signal;
a phase error estimator which estimates a phase error of at least one of the plurality of received signals, which have been inputted, in the training signal interval, and in parallel with the processing in the correlation processor;
a phase error compensator which generates, at the end of the training signal interval, a plurality of weighting coefficients by compensating for respectively a plurality of results of the correlation processings based on the estimated phase error; and
a synthesizing unit which performs multiplications in a manner that the plurality of received signals which have been inputted respectively correspond to the plurality of weighting coefficients and synthesizes results of the multiplications.

8. The receiver according to claim 7, wherein the phase error estimator estimates a conclusive phase error again by respectively estimating the phase error of each of the plurality of received signals, which have been inputted, to the training signal based on the plurality of received signals, which have been inputted via a plurality of antennas, and the training signal and by averaging the estimated plurality of phase errors.

9. The receiver according to claim 7, wherein the training signal is included in a prescribed interval of the burst signal in a sequential manner, and wherein the receiver further includes a controller which detects an end of the sequential interval of the training signal from the plurality of received signals which have been inputted, and the phase error compensator respectively compensates the plurality of results of the correlation proceedings based on the estimated phase errors at the detected end.

10. A receiving method, including:
inputting burst signals including training signals as a plurality of received signals respectively;
performing, in a training signal interval, correlation processings respectively between each of the plurality of received signals which have been inputted and the training signal;
estimating a phase error of at least one of the plurality of received signals, which have been inputted, in the training signal interval, and in parallel with the correlation processing;
generating, at the end of the training signal interval, a plurality of weighting coefficients by compensating for respectively a plurality of results of the correlation processings based on the estimated phase error; and
synthesizing results of multiplications, wherein the multiplications are performed in a manner that the plurality of received signals which have been inputted respectively correspond to the plurality of weighting coefficients.

11. The receiving method according to claim 10, wherein, in estimating the phase error of at least one of the plurality of received signals, which have been inputted, a conclusive phase error is estimated again by respectively estimating the phase error of each of the plurality of received signals, which have been inputted, to the training signal based on the plurality of received signals which have been inputted via a plurality of antennas and the training signal and by averaging the estimated plurality of phase errors.

12. The receiving method according to claim 10, wherein the training signal is included in a prescribed interval of the burst signal in a sequential manner, and wherein the method further includes detecting an end of the sequential interval of the training signal from the plurality of received signals which have been inputted and in generating the plurality of weighting coefficients, the plurality of results of the correlation processings are respectively compensated based on the estimated phase errors at the detected end.

13. A product comprising a recording medium having a computer program for causing a processing unit to perform steps of:
inputting burst signals including training signals as a plurality of received signals respectively;
performing, in a training signal interval, correlation processings respectively between each of the plurality of received signals which have been inputted and the training signal;
estimating a phase error of at least one of the plurality of received signals, which have been inputted, in the training signal interval, and in parallel with the correlation processing;
generating, at the end of the training signal interval, a plurality of weighting coefficients by compensating for respectively a plurality of results of the correlation processings based on the estimated phase error; and
synthesizing results of multiplications, wherein the multiplications are performed in a manner that the plurality of received signals which have been inputted respectively correspond to the plurality of weighting coefficients.

14. The product comprising a recording medium having a computer program according to claim 13, wherein, in estimating the phase error of at least one of the plurality of received signals, which have been inputted, a conclusive phase error is estimated again by respectively estimating the phase error of each of the plurality of received signals, which have been inputted, to the training signal based on the plurality of received signals which have been inputted via a plurality of antennas and the training signal and by averaging the estimated plurality of phase errors.

15. The product comprising a recording medium having a computer program according to claim 13, wherein the training signal is included in a prescribed interval of the burst signal in a sequential manner, and wherein the program stored in the recording medium further includes detecting an end of the sequential interval of the training signal from the plurality of received signals which have been inputted and, in generating the plurality of weighting coefficients, the plurality of results of the correlation processings are respectively compensated based on the estimated phase errors at the detected end.

* * * * *